Sept. 14, 1943.  W. B. GOODMAN  2,329,606
PROPELLER FAIRING
Filed April 6, 1940   2 Sheets-Sheet 1
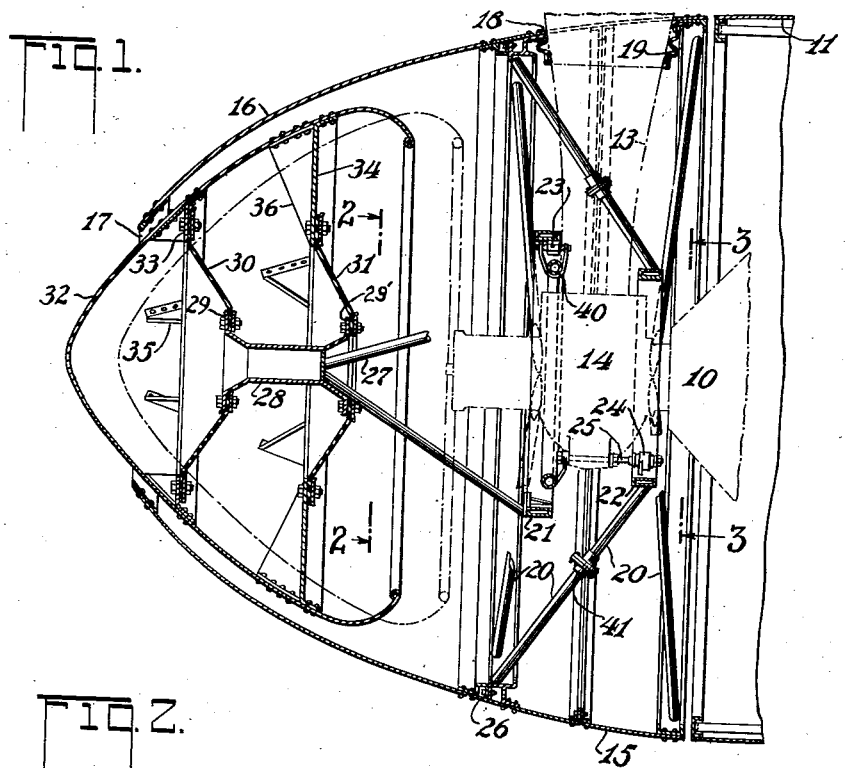
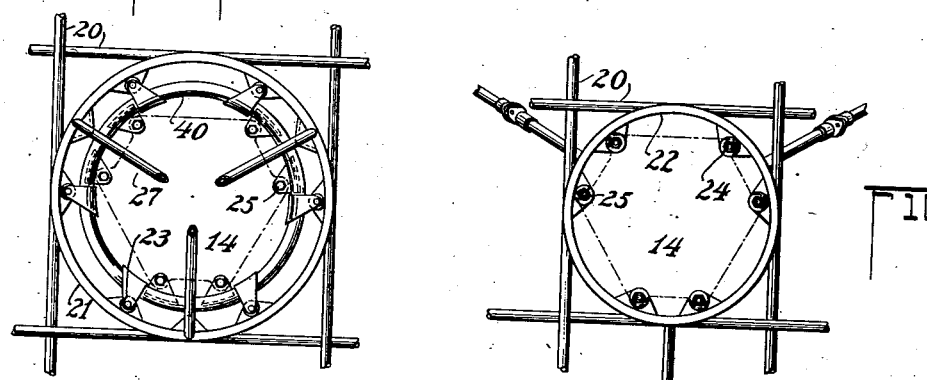
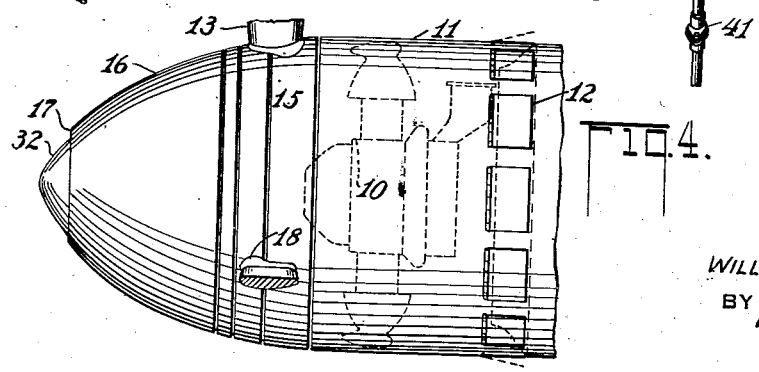
INVENTOR
WILLARD B. GOODMAN
BY
ATTORNEY Sept. 14, 1943.    W. B. GOODMAN    2,329,606
PROPELLER FAIRING
Filed April 6, 1940    2 Sheets-Sheet 2

INVENTOR
WILLARD B. GOODMAN
BY
ATTORNEY

Patented Sept. 14, 1943

2,329,606

UNITED STATES PATENT OFFICE 2,329,606

PROPELLER FAIRING

Willard B. Goodman, Radburn, N. J., assignor to Wright Aeronautical Corporation, a corporation of New York Application April 6, 1940, Serial No. 328,330

7 Claims. (Cl. 170—159)

This invention relates to aircraft power plants and is particularly concerned with novel forms of propeller fairings and spinners adapted to provide a streamlined covering, for the central portion of an aircraft propeller, which may blend into an engine embracing cowling.

The invention contemplates in one aspect the provision of a propeller fairing secured to and rotatable with the propeller, the fairing being resiliently supported on the propeller so that vibration isolation is secured as between the propeller and fairing and so that compensation is afforded for any slight unbalance which may obtain in the fairing assembly. The resilient mounts for the fairing when the latter is rotating at high speed allow the fairing to move in such fashion that its center of gravity lies upon the axis of rotation—if the axis of symmetry of the fairing does not precisely coincide with the axis of rotation or the center of gravity, the fairing may at speed appear to rotate with slight eccentricity but actually it will be rotating about its center of gravity so that no unbalanced forces will be set up.

Certain of the objects of the invention will be apparent from the above. Additional objects comprise the provision of an elastically supported automatically operable valve for an axial air entrance opening provided at the front of the fairing; to provide a spinner forward of the propeller which, while being rotatably mounted with respect to the propeller, is held from rotation with the propeller; to provide a rotatable support for a spinner and air valve organization which will permit these elements to remain stationary while a propeller rotates between these elements and a stationary support structure; and to provide a propeller fairing construction which comprises a unit separable from and attachable to a propeller with no basic changes in the propeller structure.

Further objects of the invention will become apparent in reading the sub-joined specification in connection with the drawings, in which:

Fig. 1 is an axial section through a propeller fairing organization;

Fig. 2 is a section on the line 2—2 of Fig. 1;

Fig. 3 is a section on the line 3—3 of Fig. 1;

Fig. 4 is a side elevation of a power plant installation provided with the invention.

Figure 5:
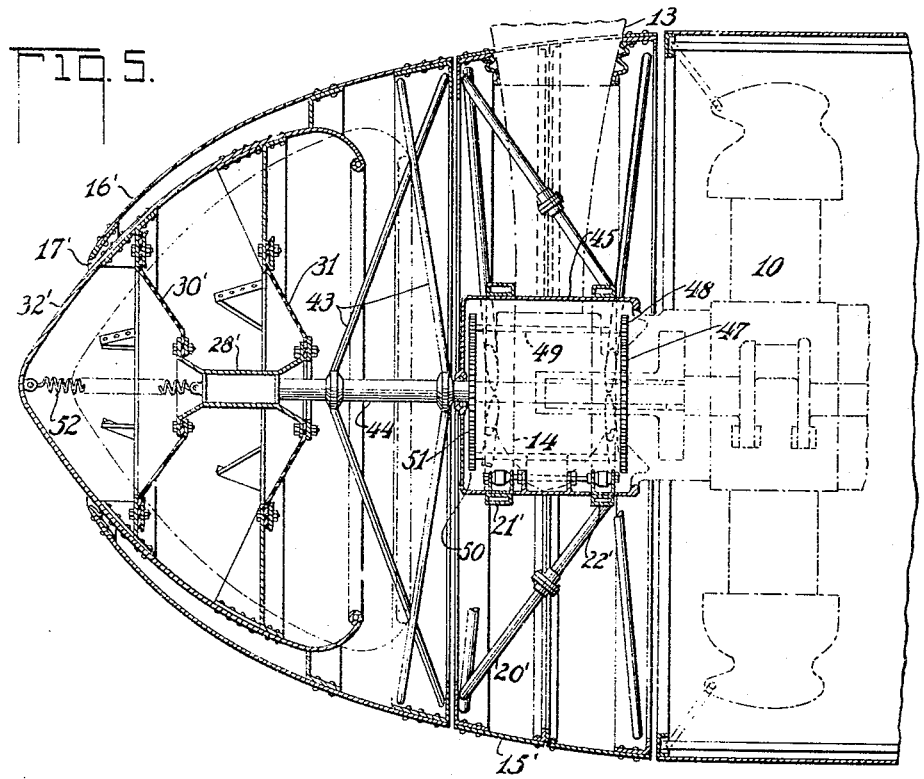
Fig. 5 is an axial section through an alternate form of propeller fairing and spinner organization.

Referring briefly to Fig. 4, I show an engine 10 of the radial cylinder aircooled type embraced by a substantially cylindrical engine cowling 11 which is provided with openings in the rearward portion thereof whose effective area may be adjusted by a plurality of segmental flaps 12, these latter elements being known in the art. The engine carries a propeller 13 at its forward end, the hub portion 14 of which is embraced by a fairing 15, the fairing 15 being carried upon the hub 14 by a spoke structure which is described in detail later in the description. The fairing 15 at its rearward edge is of the same diameter as the cowling 11 and slopes forwardly and inwardly to carry a streamlined nose spinner 16 terminating at its forward end in an axial air entrance opening 17.

Referring to Figs. 1 to 3 inclusive, the fairing 15 comprises a pair of bands each of which is cut out as at 18 to allow of the passage of the propeller blades therethrough. The cutouts 18 are of sufficiently larger size than the blade sections to allow of blade pitch change should the propeller 13 be of the controllable pitch type, and resilient boots 19 secured to the edges of the cutouts 18 closely embrace the propeller blades to prevent air leakage at the cutouts. A plurality of spokes 20, preferably of tubular form, are secured to the front end rear fairing halves and extend inwardly in non-radial directions as indicated in Figs. 2 and 3 to rings 21 and 22 which in effect form hub members for the fairing. These rings are carried upon rubber bushing fittings 23 and 24 which in turn are rigidly secured to the propeller hub 14 by bolts 25, the rubber bushings 23 and 24 providing resilient vibration isolated connections between the propeller hub and the fairing structure.

The spinner 16 is secured at its rearward edge as at 26, to the forward edge of the front fairing member and is accordingly supported by the fairing assembly and is rotatable therewith. The spinner 16 is constructed of sufficiently sturdy material so as to resist bursting stresses set up by rotation.

To the front ring 21, a tripod structure 27 is secured, this extending forwardly of the propeller to carry a sleeve 28 having flanges 29 and 29' at its front and rear ends to which annular elastic diaphragms 30 and 31 are secured. To the peripheries of the diaphragms 30 and 31 a nose valve 32 is secured, this valve having a substantially streamlined pointed nose and being movable axially to open and close the air entrance opening 17 in the spinner 16. The diaphragms 30 and 31 will be formed in such a manner that they will move the valve 32 rearwardly to open the air entrance opening 17. In operation, the air valve 32 will start in the open position when the aircraft is stationary. The diaphragms 30 and 31 will have sufficient spring effect to hold the valve open at low air speeds such as are encountered during take-off and climb, when maximum cooling airflow is essential. As the aircraft levels off and gains cruising speed, the pilot will at least partially close the trailing edge flaps 12 to reduce drag and to control cooling air flow to the minimum necessary for proper engine cooling. In this condition of flight air will impinge upon the nose of the valve 32 and will flow through the annular entrance opening 17 into the chamber formed within the spinner 16, the fairing 15, and the cowling 11; the air building up to a pressure slightly less than the dynamic pressure upon the nose of the valve 32. As air flows through the annulus 17 and in the narrow space between the rearward portion of the valve 32 and the interior surface of the spinner 16, to make up for that air which is passed through the engine for cooling, the air in the space just rearward of the opening 17 is moving at high velocity and consequently is at a reduced pressure, exerting on the valve 32 a forwardly acting force tending to close the opening 17. The valve 32 will then position itself at a position such as is shown in solid lines whereby the substantially static positive pressure within the fairing 15 plus the negative pressure due to dynamic flow between the valve and spinner will equal the impact pressure of the airstream on the nose of the valve whereby the air entrance opening 17 will be maintained automatically at a minimum consistent with the provision of adequate cooling airflow to the engine. This minimum air entrance opening is a distinct advantage since it is accompanied by minimum drag at the forward end of the fairing. The structure of the valve 32 includes bulkheads 33 and 34 reinforced by gussets 35 and 36, the inner edges of the bulkheads, which are annular, serving as bearing portions to which the peripheries of the diaphragms 30 and 31 are secured. It will be seen that the diaphragms 30 and 31 not only provide a spring tending to urge the valve 32 toward an open position, but also provide means by which the valve is carried on the propeller structure. The diaphragms 30 and 31 are susceptible of radial elasticity providing a resilient support in the rotative system for the valve 32.

As indicated in Fig. 2, the forward ring 21 is joined through the bushings 23 to an auxiliary ring 40 which is secured to the propeller hub 14 by the bolts 25. These bolts provide the sole connection of the fairing and spinner structure to the propeller and the propeller hub per se is normally provided with bolts of this character for propeller assembly so that attachment of the fairing and spinner assembly involves no change in propeller design.

Referring briefly to Fig. 1, it will be noted that the spokes 20 which join the rear ring 22 to the forward part of the fairing 15 are provided with separable couplings 41 so that the front and rear halves of the fairing 15 may be disassembled from the front and rear sides of the propeller.

Referring now to Fig. 5, the fairing structure 15' is shown as being substantially similar in construction and support to that shown in Fig. 1. However, the spinner 16' is not secured to the fairing 15' but rather is supported by spokes 43 joined to a shaft 44 which is floatingly piloted in the propeller hub and in the engine propeller shaft. The fairing support rings 21' and 22' are embraced by a housing 45 which in turn embraces the propeller hub, the housing 45 providing protection for a gear train by which the spinner 16' is held from rotation as the propeller 13 and fairing 15' rotate between spinner 16' and the engine 10. The gearing comprises a gear 47 secured to the nose of the engine which is meshed with pinions 48 carried on quill shafts 49 journalled in and rotatable with and with respect to the propeller hub 14.

The front ends of the quill shafts 49 carry pinions 50 similar to the pinions 48 and meshed with a gear 51 which is rigid with the floating shaft 44. Since the gear 47 is stationary, the gear 51 must likewise remain stationary due to the planetizing of the quill shafts 49 and the pinions 48 and 50 about the propeller axis and with the propeller, whereby the spinner 16' as well as the valve 32' do not rotate. Accordingly, these elements are not subjected to centrifugal force due to propeller rotation and are isolated from the rotating system to the end that they are non-responsive to any unbalance thereof.

In Fig. 5 the valve 32 is shown as being supported by elastic diaphragms in the same manner as in Fig. 1, the sleeve 28' being rigidly secured to the shaft 44 which in this arrangement replaces the tripod 27. Fig. 5 further shows a tension spring 52 between the valve 32' and the sleeve 28' which augments the action of the diaphragms 30 and 31 in pressing the valve 32 in a rearward direction to open the air entrance opening to assure full area for cooling air flow at such times as the air speed is low.

In both embodiments shown it is contemplated that engine cooling air will pass through the air entrance opening 17 and through the spinner and fairing to the engine compartment whereby projecting airscoops of either segmental or annular form are wholly eliminated from the power plant assembly, thereby increasing the aerodynamic cleanness of the installation.

Although the invention has been shown in connection with a radial aircooled engine, the particular form of the engine is immaterial in practicing the invention. For instance, if inline type engines are used, which have considerably less frontal area than radial engines, the overall diameter of the engine cowling, and propeller fairing, and spinner, may be reduced with consequent improvement in the streamlined form of the power plant assembly.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a fairing assembly for an aircraft propeller having radially extending blades, a structural extension projecting forwardly of the propeller and concentric therewith, axially spaced flanges on said extension, elastic annular diaphragms secured to the flanges at the inner diameter of said annular diaphragms, a streamlined nose element carried by said diaphragms at the outer diameter thereof, and a streamlined forwardly extending fairing carried by the propeller and embracing a substantial portion of said nose element, the fairing having a forward opening for which the nose element forms an adjustable closure.

2. In a fairing assembly for an aircraft propeller having radially extending blades, a structural extension projecting forwardly of the propeller and concentric therewith, axially spaced flanges on said extension, elastic annular diaphragms secured to the flanges at the inner diameter of said annular diaphragms, a streamlined nose element carried by said diaphragms at the outer diameter thereof, and a streamlined forwardly extending fairing carried by the propeller and embracing a substantial portion of said nose element, the fairing having a forward opening for which the nose element forms an adjustable closure, said nose element and fairing being further characterized by being resiliently secured to the propeller for rotation therewith.

3. In a fairing assembly for an aircraft propeller having radially extending blades, a structural extension projecting forwardly of the propeller and concentric therewith, axially spaced flanges on said extension, elastic annular diaphragms secured to the flanges at the inner diameter of said annular diaphragms, a streamlined nose element carried by said diaphragms at the outer diameter thereof, and a streamlined forwardly extending fairing carried by the propeller and embracing a substantial portion of said nose element, the fairing having a forward opening for which the nose element forms an adjustable closure, said nose element and fairing being constrained from rotation with the propeller.

4. In an aircraft propeller comprising a hub, parts separated by rubber one of which is secured to the propeller hub, a ring embracing the hub and secured to the other said part, spokes extending from the ring, an open front fairing member embracing the ring and through which the propeller blades extend in clearance relation, the member being carried by said spokes, a tripod member secured to the ring, and an axially movable nose element supported by the tripod and forming a closure for said fairing opening.

5. In a fairing assembly as recited in claim 1, in which the pressure differential across the nose element created by the flow of air through the open end of the fairing operates to adjustably position the nose element relative to said forward opening in the fairing.

6. In a fairing assembly for an aircraft propeller having outwardly extending blades, a fairing member extending forwardly of the propeller and having a forward axial opening, an axially disposed nose element, and flexible means for mounting said nose element within said fairing, said flexible means permitting automatic axial movement of the nose element relative to said forward axial opening in response to the differential pressure on the forward and rearward surfaces of said nose element, whereby said nose element cooperates with said opening to provide an automatically adjustable closure therefor operable in response to air flow therethrough.

7. In a fairing assembly for an aircraft propeller having outwardly extending blades, a fairing member extending forwardly of the propeller and having a forward axial opening, an axially disposed nose element, and flexible means for mounting said nose element within said fairing, said flexible means comprising a pair of resilient diaphragms permitting automatic axial movement of the nose element relative to said forward axial opening in response to the differential pressure on the forward and rearward surfaces of said nose element, whereby said nose element cooperates with said opening to provide an automatically adjustable closure therefor operable in response to air flow therethrough.

WILLARD B. GOODMAN.